Feb. 16, 1937.　　　J. A. STREUN　　　2,071,049
COTTON DRIER
Filed April 20, 1936
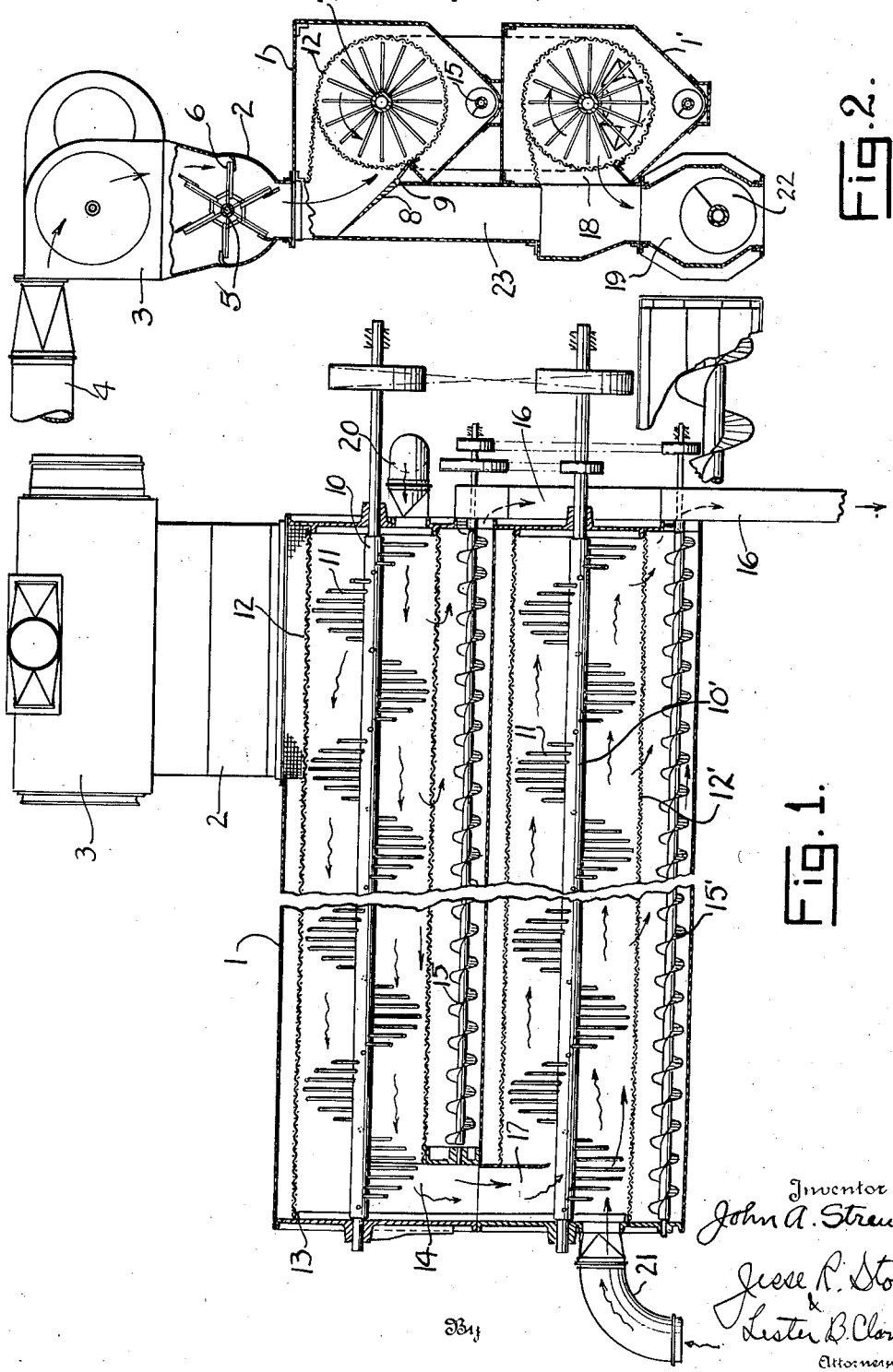

Patented Feb. 16, 1937

2,071,049

UNITED STATES PATENT OFFICE 2,071,049

COTTON DRIER

John A. Streun, Sherman, Tex., assignor to Hardwicke-Etter Company, Grayson County, Tex., a corporation Application April 20, 1936, Serial No. 75,289

6 Claims. (Cl. 19—91)

My invention relates to driers to be employed in connection with cotton cleaning and ginning apparatus.

It is an object of the invention to provide a drier within which the cotton may be freely agitated and cleaned and at the same time submitted to the action of a current of heated air to dry the cotton.

I desire to form a drier for cotton which will act upon the cotton to dry the same before it is distributed to the cleaners or to the gin. I desire to place a drier at a point above the distributor by means of which the cotton is delivered to the cleaning or ginning apparatus.

I also have as an object to thoroughly heat and dry the cotton during its passage through the drier and to employ the current of heated air to assist in the cleaning of the cotton so that the cotton will be both cleaned and dried in its passage through the apparatus.

In the drawing herewith Fig. 1 is a front view partly in elevation and partly in vertical section illustrating the construction of my drying apparatus.

Fig. 2 is a similar view taken at the end of the view shown in Fig. 1.

I have shown my drying apparatus as positioned within a housing 1 which receives the cotton to be dried from a dropper housing 2 receiving the cotton from the separator 3. It will be understood that the cotton entering the separator through the pipe 4 is carried thereto through the pipe 4 by a current of air from a fan. In the separator 3 the cotton is delivered downwardly to a seal or dropper 5 housed within the housing 2. This dropper is of ordinary construction consisting of a rotating valve having a plurality of radial flights 6 thereon, the outer ends of which are formed with flexible sealing members which contact with the walls of the housing 2. The dropper prevents the passage of air from the separator but in rotating carries the cotton downwardly between adjacent flights and delivers it to the drier as shown in the drawing.

The drier consists of a housing 1, or rather a plurality of housings 1 and 1', situated in superposed position to allow the passage of the cotton longitudinally thereof. As seen in Fig. 2 the cotton is directed toward one of the agitating conveyers 7 by means of an adjustable valve 8 pivoted at 9 in the housing to be thrown into position to open or close the passage to the agitator.

The agitator 7 comprises a rotating shaft member 10 having a spiral row of radial pins 11 thereon which, due to the rotating of the shaft, act as a conveyer to move the cotton longitudinally of the housing and to also agitate and fluff the cotton during its passage through the housing.

Spaced closely adjacent the outer ends of the pins or spikes 11 is an approximately cylindrical screen member 12. Said screen is open adjacent the dropper 5 to receive the cotton passing thereto but has its upper end connected with the end 13 of the housing. On the lower side the cylindrical screen member 12 is formed with an opening at 14 through which the cotton may drop from the upper chamber 1 of the housing. It will be understood that the cylindrical screen members 12 form compartments through which the cotton is passed while it is being agitated. The air is freely circulated through the cotton and dirt is eliminated because of the foraminated walls of the compartments.

Below the cylindrical screen chamber 12 the walls of the housing slope downwardly to carry the screenings from the cotton to the screw conveyer 15 which is rotatable to carry the chaff and dirt to the chute 16 leading from the drier.

In the lower housing 1' there is a similar agitating conveyer 10' having spirally arranged spikes or pins 11 thereon in the same manner as in the upper chamber. This conveyer rotates in a direction to carry the cotton backward in a reverse direction from that in the upper chamber. The cotton drops from the upper chamber through an opening 17 and is received on the lower agitating conveyer which carries it to the other end of the machine and there discharges it through the opening 18 shown best in Fig. 2. It there drops into the distributor trough 19.

Below the screen chamber 12' of this housing is a conveyer 15' which carries the chaff and dirt to the outlet passage 16 previously referred to.

During the passage of the cotton through the machine in the manner described it is submitted to the action of a draft of heated air. It is to be understood that this air may be obtained in any desired manner, the most common example of which is to blow the air from a fan across heated pipes by means of which the air is raised to the proper temperature. It is then delivered through a pipe 20 at the lower end of the screen chamber 12 so that the air passes longitudinally through the upper chamber of the housing with the cotton. The cotton will be agitated and loosened up as it passes through the upper chamber due to the action of the agitator or conveyer 11. During this time the hot air will tend to assist in moving the cotton through the conveyer but will also act to dry the same and loosen the dirt and chaff from the cotton so that it may be eliminated through the lower portion of the screen housing 12. The cotton will then pass downwardly from the upper chamber to the lower chamber where it will be acted upon by a second stream of hot air entering through the pipe or flue 21. The direction of this current of air is shown by the arrows in the drawing. The combined action of the agitator and the hot air circulating therethrough is to free the cotton of a large portion of the dirt and chaff and also effectively dry the cotton.

As the cotton passes from the outlet end of the lower chamber it will fall upon one end of the conveyer 22 mounted within the trough or housing 19 in the usual manner. It is to be understood that this is an ordinary type of conveyer acting to move the cotton along through discharge outlets or chutes to the gins or to the feeder cleaners above the gins. The heated air will pass out with the cotton to the conveyer and will tend to further dry the cotton during its passage along the distributor.

As will be seen from Fig. 2 the cotton may pass directly from the valve or dropper 5 to the distributor by way of a vertical passage 23. To accomplish this the valve 8 is swung on its pivot 9 to the right of the position shown in Fig. 2 to close the entrance to the screen chamber 12. It will, therefore, pass to the distributor without being subjected to a drying action in the drying chambers. I am thus enabled to pass the cotton directly to the distributor where the cotton has already been sufficiently dried but where batches of cotton are being ginned which are wet and soggy the valve 8 may be closed and the drier operated in such manner as to dry the cotton in the manner described.

My particular form of drier is efficient in its drying action due to the manner in which the cotton is agitated and simultaneously submitted to a draft of hot air moving in the direction in which the cotton is moving. I am enabled to act upon the cotton during its passage through the drier by two cooperating currents of dry and heated air which together will effectively remove the moisture from the cotton in its passage toward the gins. The advantages of this construction will be obvious.

What is claimed as new is:

1. A drier for cotton including a housing, upper and lower chambers in said housing, cylindrical screen compartments with walls of foraminated material extending longitudinally of said chambers, a shaft rotatable axially of each screen compartment, spirally arranged agitator pins extending radially of said shaft, adapted when said shafts are rotated to fluff and agitate the cotton and move it through said screen compartments, a passage from said upper compartment to said lower compartment at one end, means to deliver cotton to said upper chamber, means to receive and distribute the cotton from said lower compartment, and means to deliver a current of heated air into the stream of cotton passing through said chambers in the direction of movement of said cotton.

2. A drier for cotton including a housing, upper and lower chambers in said housing, cylindrical screen compartments with walls of foraminated material extending longitudinally of said chambers, a shaft rotatable axially of each screen compartment, spirally arranged agitator pins extending radially of said shaft, adapted when said shafts are rotated to fluff and agitate the cotton and move it through said screen compartments, said shafts rotating in the direction to carry the cotton in one direction in said upper compartment and in the opposite direction in said lower compartment, a passage from said upper compartment to said lower compartment at one end, means to deliver cotton to said upper chamber, means to receive and distribute the cotton from said lower compartment, and means to deliver a current of heated air into the stream of cotton passing through said chambers in the direction of movement of said cotton.

3. A drier for cotton including a housing, upper and lower chambers in said housing, cylindrical screen compartments with walls of foraminated material extending longitudinally of said chambers, a shaft rotatable axially of each screen compartment, spirally arranged agitator pins extending radially of said shaft, adapted when said shafts are rotated to fluff and agitate the cotton and move it through said screen compartments, a passage from said upper compartment to said lower compartment at one end, means to deliver cotton to said upper chamber, means to receive and distribute the cotton from said lower compartment, conveyors in the lower sides of each chamber to move the dirt and foreign material from said compartments out of said housing, and means to deliver a current of heated air into the stream of cotton passing through said chambers in the direction of movement of said cotton.

4. A cotton dropper, a cotton distributor to move the cotton to a plurality of cotton machines, a drier housing between said dropper and said distributor, upper and lower chambers in said housing connected together by a passage at one end, a screen compartment extending longitudinally of each of said chambers, shafts rotatable longitudinally of each compartment, radial pins on each shaft arranged spirally around the same to agitate and move said cotton through said compartments and deliver it to said distributor, means to deliver a current of hot air through said cotton in said upper chamber and separate means to deliver hot air in the direction of movement of said cotton in said lower chamber, whereby said cotton is agitated, dried and cleaned before it reaches said distributor.

5. A cotton dropper, a cotton distributor to move the cotton to a plurality of cotton machines, a drier housing between said dropper and said distributor, upper and lower chambers in said housing connected together by a passage at one end, a screen compartment extending longitudinally of each of said chambers, means in each of said compartments to agitate and move said cotton through said compartments and deliver it to said distributor, means to deliver a current of hot air through said cotton in said upper chamber and separate means to deliver hot air in the direction of movement of said cotton in said lower chamber whereby said cotton is agitated, dried and cleaned before it reaches said distributor.

6. A cotton dropper, a cotton distributor to move the cotton to a plurality of cotton machines, a drier housing between said dropper and said distributor, upper and lower chambers in said housing connected together by a passage at one end, a screen compartment extending longitudinally of each of said chambers, means to remove foreign material passing through the walls of said screen compartments, shafts rotatable longitudinally of each compartment, radial pins on each shaft arranged spirally around the same to agitate and move said cotton through said compartments and deliver it to said distributor, means to deliver a current of hot air through said cotton in said upper chamber and separate means to deliver hot air in the direction of movement of said cotton in said lower chamber, whereby said cotton is agitated, dried and cleaned before it reaches said distributor.

JOHN A. STREUN.